US011772348B2

(12) United States Patent
Van de Vijver et al.

(10) Patent No.: US 11,772,348 B2
(45) Date of Patent: Oct. 3, 2023

(54) ADJUSTABLE MECHANICAL STOP FOR A FOOD BAKING APPARATUS

(71) Applicant: Incomec Cerex NV, Brakel (BE)

(72) Inventors: Johan Van de Vijver, Zottegem (BE); Filip Keereman, Zwalm (BE); Emmanuel Petre, Sint-Denijs Westrem (BE)

(73) Assignee: INCOMEC CEREX NV, Brakel (BE)

( * ) Notice: Subject to any disclaimer, the term of this patent is extended or adjusted under 35 U.S.C. 154(b) by 978 days.

(21) Appl. No.: 16/361,518

(22) Filed: Mar. 22, 2019

(65) Prior Publication Data
US 2019/0291374 A1    Sep. 26, 2019

(30) Foreign Application Priority Data

Mar. 23, 2018 (BE) .................................. 2018/5198

(51) Int. Cl.
*B30B 15/02* (2006.01)
*A21B 5/02* (2006.01)
(Continued)

(52) U.S. Cl.
CPC .............. *B30B 15/022* (2013.01); *A21B 1/42* (2013.01); *A21B 5/02* (2013.01); *A21B 5/023* (2013.01);
(Continued)

(58) Field of Classification Search
CPC ............ B30B 15/0029; B30B 15/0035; B30B 15/0041; B30B 15/022; A23P 30/10;
(Continued)

(56) References Cited

U.S. PATENT DOCUMENTS 4,281,593 A  *  8/1981  Gevaert ................... A21B 5/02
                                                        99/323.4
4,504,209 A      3/1985  Skloss
                 (Continued)

FOREIGN PATENT DOCUMENTS

DE        4125992 A1  *  2/1993  ............. B21D 28/20
DE    102013101180 A1     8/2014
EP        0499301 A2      1/1992

OTHER PUBLICATIONS

Translation of DE-4125992-A1 (Year: 1993).*
Belgium Search Report in reference to co-pending to Belgium Application No. BE2018/5198 filed Mar. 23, 2018.

*Primary Examiner* — Xiao S Zhao
*Assistant Examiner* — John J DeRusso
(74) *Attorney, Agent, or Firm* — DINSMORE & SHOHL, LLP

(57) ABSTRACT

A food baking apparatus includes a compressible die and a mechanical stop for controlling a die spacing of the compressible die. The mechanical stop includes a supporting system and a mounting element mounted onto the supporting system. The mounting element includes at least one protrusion having a particular amount of protrusion from the mounting element, which amount of protrusion may be adjustable for any single protrusion. By translation or rotation of the supporting system and/or the mounting element during operation of the apparatus, a protrusion is selected. The protrusions mechanically stop further compression of the dies during an operation of the food baking apparatus. Thus, the selection determines the die spacing applicable for the baking process, based on the amount of protrusion of the selected protrusion.

9 Claims, 4 Drawing Sheets

(51) Int. Cl.
| | |
|---|---|
| *A23P 30/10* | (2016.01) |
| *B30B 15/00* | (2006.01) |
| *B29C 33/34* | (2006.01) |
| *A23L 7/126* | (2016.01) |
| *A21D 13/047* | (2017.01) |
| *A21D 8/06* | (2006.01) |
| *A23P 10/28* | (2016.01) |
| *A23P 30/30* | (2016.01) |
| *A23L 7/178* | (2016.01) |
| *A21B 1/42* | (2006.01) |

(52) U.S. Cl.
CPC .............. *A21D 8/06* (2013.01); *A21D 13/047* (2017.01); *A23L 7/126* (2016.08); *A23L 7/178* (2016.08); *A23P 10/28* (2016.08); *A23P 30/10* (2016.08); *A23P 30/30* (2016.08); *B29C 33/34* (2013.01); *B30B 15/0029* (2013.01)

(58) Field of Classification Search
CPC .............. A47J 2037/0617; A23L 7/126; A23L 7/178; A21B 5/02
See application file for complete search history.

(56) References Cited

U.S. PATENT DOCUMENTS

| | | | |
|---|---|---|---|
| 5,467,693 A | * 11/1995 | Van den Berghe | A21C 11/00 99/349 |
| 2011/0214573 A1 | 9/2011 | Kim | |
| 2012/0011722 A1 | * 1/2012 | Briese | E06B 3/663 29/897.3 |
| 2014/0260491 A1 | * 9/2014 | Briese | A21B 5/02 99/323.4 |

* cited by examiner

ADJUSTABLE MECHANICAL STOP FOR A FOOD BAKING APPARATUS

CROSS REFERENCES TO RELATED APPLICATIONS

This application is filed under 35 U.S.C. § 111 and claims the benefit of priority under 35 U.S.C. §§ 119 (a)-(d) to Belgian Patent Application No. BE2018/5198, filed Mar. 23, 2018, the contents of which are hereby incorporated by reference in their entirety.

TECHNICAL FIELD

The invention relates to a system and method for improvingly controlling the production of food products from granular raw materials such as cereal rice, corn or the like and mixtures thereof, or from starchy materials like grains or pellets or a mixture thereof, optionally mixed with crushed grain material, or with other inclusions of less starchy nature, which are formed into crackers, chips or shaped end-products in general. More in particular the invention relates to an improved system and method for carrying out a method of producing a cracker from cereals, which are pressure-baked in a heated mold and expanded afterwards.

BACKGROUND OF THE INVENTION

Systems and apparatuses are currently on the market to form starchy materials into finished crackers, chips, cakes or the like forms. In general they all use the principle of dosing a certain volume of granular raw materials in a kind of chamber that is subsequently closed, and wherein then the materials are compressed in between heated dies or molds, causing the materials who do contain a certain amount of water to plastify under heat and pressure. After one or several compressions, the dies are opened up and the materials will expand into a stable shape, which may be very regular or rather irregular and will have different textures and expansion degrees depending on its final purpose.

During the food baking process mentioned, it is always necessary to prevent the plastified material, being in a kind of semi-liquid state as a result of heat, pressure and moisture, from escaping through the narrow gaps, which are for technical reasons always present in the closed chamber. According to the art, preventing the plastified material from escaping through the narrow chamber gaps is achieved in several possible ways, or as a combination thereof. Either the applied pressure is restricted within a certain range or below a particular value, so that there is always insufficient pressure for the dies to touch each other. Only in case the pressure is such that the dies do touch each other, the plastified material is forced out of the closed chamber. Preventing the plastified material from escaping the chamber may also result when the time for applying the pressure is controlled in such a way that it is kept limited so that the dies will never touch each other. Further alternatively, a mechanical stop can be provided preventing the dies from touching each other, and thus there is always a distance remaining between the dies. Hence, again the plastified material is not forced out of the closed chamber. An example of such a mechanical stop is depicted in FIG. 1.

Referring to FIG. 1, part of a food baking apparatus as known in the art is illustrated. In particular, a drive system 10 is depicted, comprising of hydraulic cylinders 11, 12 and a drive shaft 14. At the left side the hydraulic drive system 10 is connected via the drive shaft 14 to a transmission member 15, which is in the form of a two-arm joint having an upper arm 16 rotatably connected to a moveable punch 18 and a lower arm 17 rotatably connected to the apparatus frame 13. When the punch 18 is raised by hydraulically pushing transmission member 15 towards a near vertical alignment of the upper and lower arm 16, 17, the end of the compression stroke, i.e. the top position of the punch inside the dies (not shown) is defined by a mechanical stop 19 comprising of bolts 20, 21, which stop the hydraulic drive.

Finally, the stroke of the driving parts for making the dies move, is for example limited such that it is impossible for the dies to touch each other. Another kind of mechanical stop is herewith determined, i.e. the end of the stroke of the driving parts.

In any of the described ways of preventing of forcing the plastified material out of the closed chamber, there is very little control and therefor it remains extremely difficult to reach the exact product or cracker with desired structure, texture and crispness, unless by means of continuous trial and error.

Moreover, there is no controlled adjustability for the distance in general between the dies. In other words, fine-tuning for an appropriate relative position of the dies amongst each other, when performing pressure baking, is not an easy process. There is a need for system and method for controlling cracker or chips production comprising either multiple compressions, or else for which applying a partial press is required.

AIM OF THE INVENTION

The aim of the invention is to provide a better and more accurate way of controlling the process of food pressure baking. More in particular, the aim is to better control the distance between the dies, where in between a food product is baked, and to provide the possibility of an adjustable distance between the dies in case of multiple compressions of the food material, for which for example adjustable die spacings or different die spacings can then be installed, leading to very repeatable and unchanging food processing conditions and thus an improved and much more constant quality of end product such as a cracker.

SUMMARY OF THE INVENTION

In a first aspect of the invention an adjustable mechanical stop is provided, for controlling the distance between a first and a second die, also referred to as die spacing, of a food baking apparatus, comprising a supporting system and at least one mounting element mounted onto the supporting system, wherein the supporting system and/or the at least one mounting element are adjustable in spatial position, being movable for translation and/or rotation; and wherein each mounting element comprises one or more protrusions, and wherein per mounting element the one or more protrusions are adjustable in amount of protrusion, and/or the protrusions differ in amount of protrusion amongst each other. In between the die spacing, a to be baked food product is provided before the food baking process starts. Having finished the food baking process, the food product in between the de spacing usually will have changed structure and appearance while then having been baked. The mechanical stop being adjustable means that the installation or settings can be changed, such that the stop mechanism for instance may occur later or sooner in time when a drive system is approaching it. As an example, the mechanical stop mechanism can be applied to stop the hydraulic drive of a food baking apparatus. According to an embodiment, the adjustable mechanical stop is provided at the end of a hydraulic or pneumatic drive system such that the hydraulic or pneumatic drive mechanism is controlled during a food baking process. According to a particular embodiment, such control is performed during the food baking process of one single food product, and hence the baking of this single food product is manipulated in a controlled way during the food baking process. In accordance with an embodiment of the invention, such manipulation is often also referred to as applying and/or controlling double or multiple compression, which in fact may directly result from controlling the die spacing where in between the food product is provided for being baked. The protrusions being adjustable in amount of protrusion implicates the protrusions being movable, i.e. not fixed to the one or more mounting elements. However, in case the protrusion differ in amount of protrusion amongst each other, it is also possible that the protrusions are fixed to the one or more mounting elements. According to an embodiment, it may seem that the protrusions being fixed to the one or more mounting elements form one entity, i.e. that the protrusions are seamlessly integrated with the one or more mounting elements.

The supporting system can be a plate or a disk or a platform onto which other elements can be mounted. The supporting system can be fixed installed on the apparatus frame or either movable in a certain direction. According to an embodiment, the supporting system is rotatable around an axis being parallel with the direction of the protrusions of the one or more mounting elements mounted onto the supporting system, herewith changing radial position of the one or more mounting elements, and hence the radial position of the protrusions with respect to the axis. More in particular, according to further embodiment, the supporting system is a circularly shaped plate or disk and can be rotated around its central axis.

The one or more mounting elements onto the supporting system can be fixed installed or are either randomly movable, i.e. in different positions on the supporting system. According to an embodiment of the invention, the one or more mounting elements comprise per mounting element at least two protrusions, differing in amount of protrusion amongst each other, and these one or more mounting elements are movable along an axis being perpendicular to the protrusions of the one or more mounting elements, herewith shifting the one or more mounting elements towards another position. More in particular, according to further embodiment, the one or more mounting elements can be shifted or translated within corresponding recesses provided in the supporting system such as for instance a supporting platform, e.g. along an axis perpendicular to the direction of the protrusions provided onto or protruding from the mounting elements. One or more protrusions can be provided onto each of the one or more mounting elements, whereas the protrusion length of these protrusions can vary amongst each other. The protrusions can be for example bolts or rod-shaped. Moreover, the protrusion length of these protrusions can be adjustable, e.g. by means of letting these protrusions protrude more or less from the mounting elements, such as for example by means of screwing the protrusions deeper or less deep within their corresponding mounting elements. Adjusting the protrusion length of the protrusions can occur manually, or either can be performed in a motorized way.

It is noted that the mounting elements are mounted either in a fixed way, and for example being attached to the supporting system, or else the mounting elements are movably mounted onto the supporting system. With movably mounted is meant for instance that a guiding (rail) system or slot system is provided, such that the mounting elements are although being linked or connected to the supporting system, can be easily displaced by e.g. a translation or rotation movement, for which the mechanical configuration is furnished. In other words, it may seem that the mounting elements are rather pending or hanging on the supporting system because of their movability as foreseen.

Movement of the supporting system and/or the one or more mounting elements can be performed manually, or by means of a mechanical, electrical, pneumatic or hydraulically driven system.

According to an embodiment of the invention, the adjustable mechanical stop comprises a supporting system, being plate-shaped and rotatable around a central axis perpendicular to the plate surface, and at least two mounting elements mounted onto the supporting system. Moreover the mounting elements are even in number, and mounted onto the supporting system per pair in a circular symmetric manner. More in particular, according to further embodiment, each pair of mounting elements comprises a first mounting element comprising a first protrusion and a second mounting element comprising a second protrusion, and wherein the first mounting element and hence corresponding first protrusion is positioned diametrically opposite to the second mounting element and therefor corresponding second protrusion. The protrusions of the mounting elements may differ in amount of protrusion per pair of mounting elements.

In a second aspect of the invention a food baking apparatus is provided, comprising an adjustable mechanical stop in accordance with the first aspect. More in particular the food baking apparatus is for instance configured for producing crackers, chips or the like from cereals or granular raw materials in general, which are pressure-baked between heated dies and expanded afterwards.

In a third aspect of the invention a method is provided for controlling the die spacing of a food baking apparatus, comprising the steps of (i) providing an adjustable mechanical stop according to the first aspect; (ii) putting the supporting system and/or the one or more mounting elements in a first position; (iii) driving the supporting system and/or the one or more mounting elements towards a second position. In between the die spacing, i.e. the distance or space between a first and a second die, a food product is being laid or provided, wherein such food product is before applying the method in accordance with third aspect, while meaning before the food baking process, in a still unbaked status. By means of example, the still unbaked status can be for instance that the food product appears as raw cereal, or dough, whereas after the food baking process, during which the method in accordance with third aspect is applied, the food product rather appears e.g. as a chip, or cracker. Possibly before step (ii) an intermediate step is foreseen, wherein per mounting element the one or more protrusions are adjusted in amount of protrusion. According to an embodiment, the method further comprises additional steps of driving the supporting system and/or the one or more mounting elements towards an even further position than second position. Multiple different positions may be available or configurable depending on the architecture and design of the supporting system and/or the one or more mounting elements. By means of example, in an embodiment n different positions are provided, wherein n is an integer number. Hence, driving the supporting system and/or the one or more mounting elements from the first to the n-th position can be executed. According to an embodiment, the method is applied during one and the same food baking process for baking one single food product, as being provided in between the die spacing. In other words, the die spacing is then controlled during the baking process of one single food product. Or, as a consequence, double or multiple compression can be controlled during this one single food product baking process, and hence resulting in controlled food processing with improved and much more constant quality of baked food product.

In a fourth aspect of the invention a food baking process is provided based on double or multiple compression, the process comprising the step of providing an adjustable mechanical stop according to the first aspect, for controlling the distance between a first die and a second die of a food baking apparatus, and herewith controlling the double or multiple compression. With multiple is meant here more than double, i.e. for example triple or quadruple or even a higher multiplication is applied.

In a fifth aspect of the invention crackers, chips or the like are made by means of a food baking process in accordance with the fourth aspect.

DETAILED DESCRIPTION OF THE INVENTION

The invention relates to a solution for providing a better and more accurate way of controlling the distance between the dies, i.e. the mutual die distance, of a food baking apparatus. More in particular, a system is provided to obtain an accurate and repeatable way of controlling the die distance. Further, with the invention the possibility is offered of having different installable die distances in case of multiple compressions of the food ingredient such as for instance rice or other granular raw material. Very repeatable and unchanging processing conditions are herewith achieved, and thus an enhanced and much more constant quality of end product, being for example a cracker or chip, is reached. Due to the entered control of the die distance, disturbing factors having an influence thereon can be eliminated, being for instance moisture content (and thus liquidity in the compressed status) of the food materials, temperature changes of food materials and/or dies, changes in response time of pneumatic, electrical, electronic or hydraulic components etc. Hence, with the invention, a system is provided to eliminate disturbing and varying factors and their influence on the die distance, and thus reducing varying processing conditions leading to irregular or unwanted end products. Moreover, it becomes possible to avoid so-called over-compression in a very repeatable way of certain food materials like for instance oily seeds where often too much oil is being pressed out as a result of heat and pressure.

Figure 1:
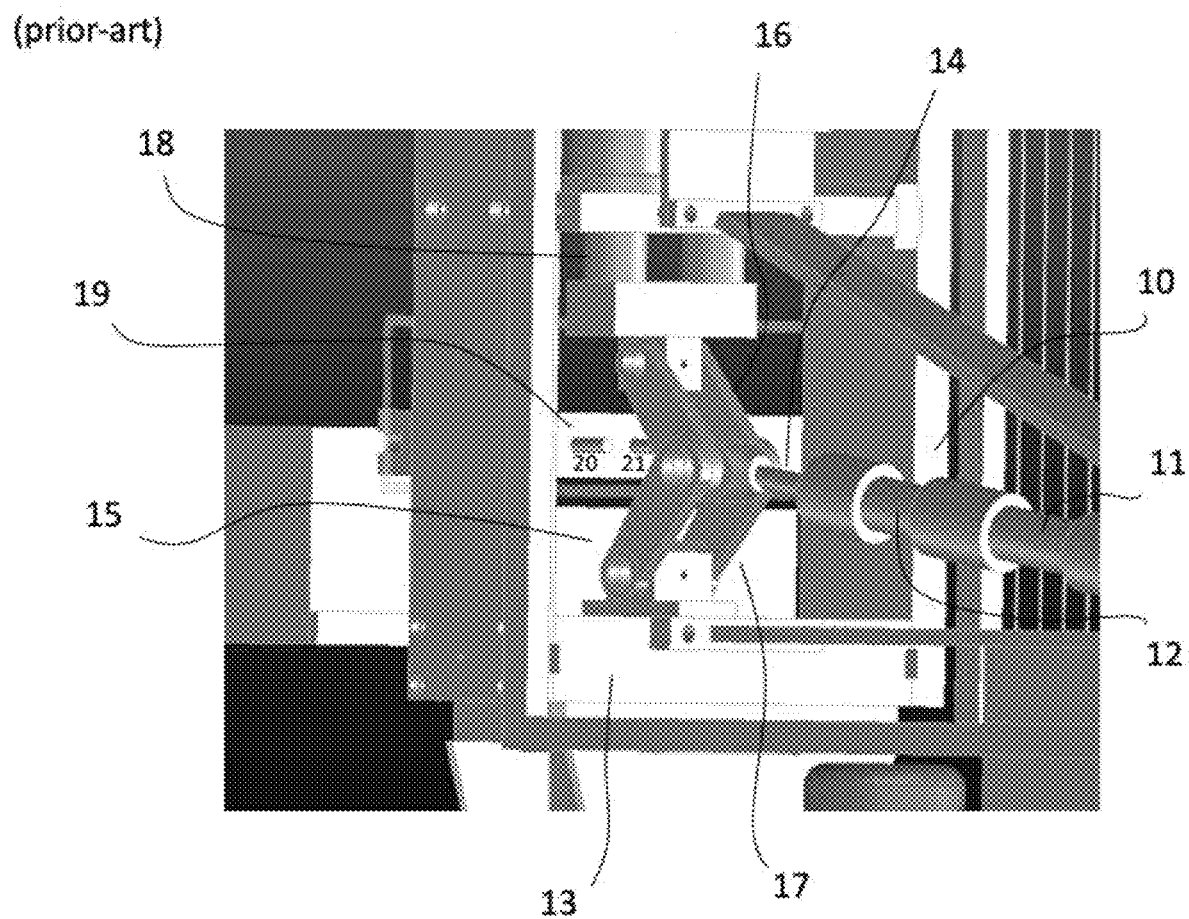
FIG. 1 illustrates a mechanical stop of a food baking apparatus in accordance with the art.
Figure 2:
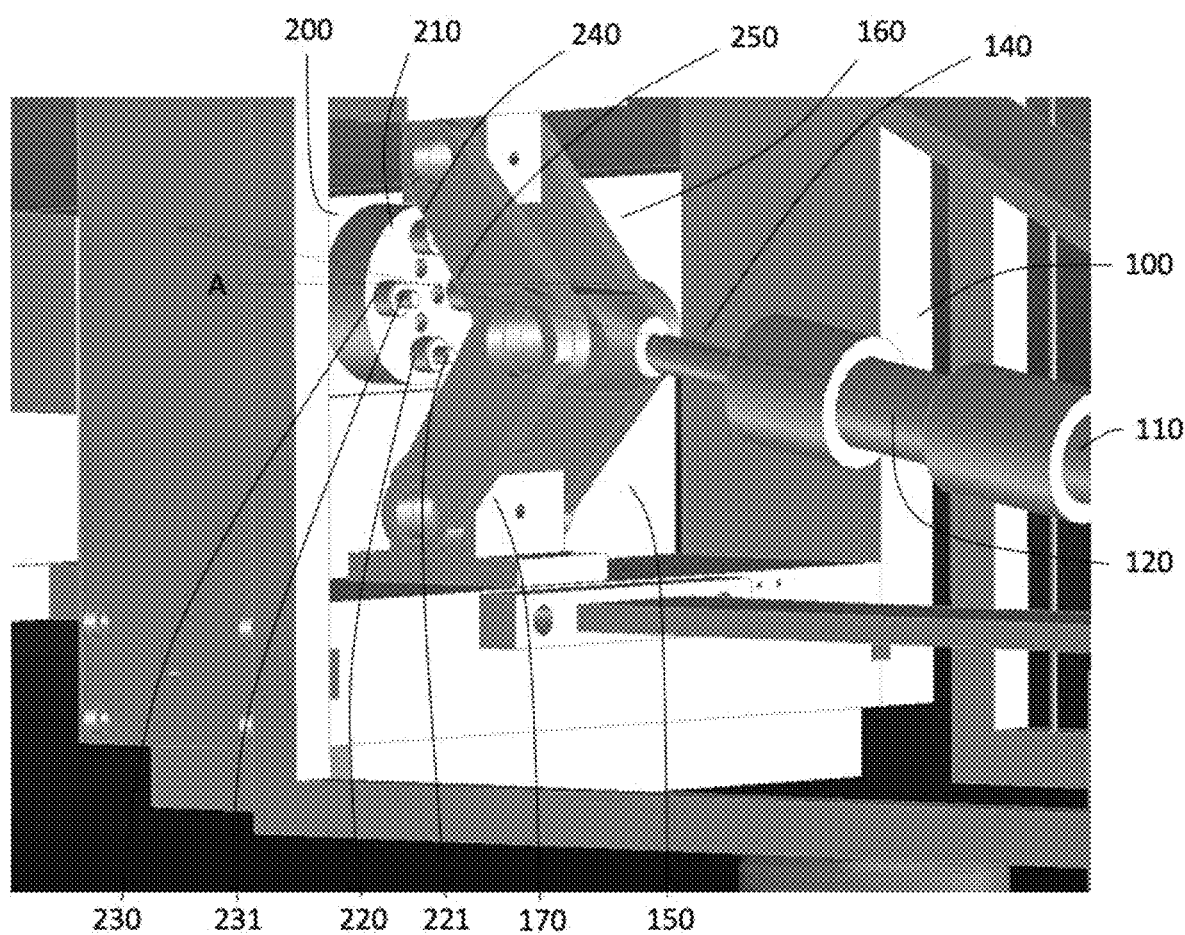
FIG. 2 illustrates an embodiment of an adjustable mechanical stop for a food baking apparatus in accordance with the invention.

In FIG. 2, part of a food baking apparatus is illustrated for some parts comparable with FIG. 1, particularly with respect to the hydraulic drive system. Again, a drive system 100 is depicted, comprising of hydraulic cylinders 110, 120 and a drive shaft 140. The hydraulic drive system 100 is here also connected to a transmission member 150, having an upper arm 160 and a lower arm 170. Raising the punch by hydraulically pushing transmission member 150 towards a near vertical alignment of the upper and lower arm 160, 170, the end of the compression stroke, i.e. the top position of the punch inside the dies (not shown), is now defined by the installation and settings of a mechanical adjustable stop 200, being able to stop the hydraulic drive in different ways, depending on selected configuration, hereinafter also referred to as drive stopper, more in particular here referred to as horizontal drive stopper. With the design and positioning of mechanical adjustable stop 200, the drive system 100 is stopped along a more or less horizontal direction, i.e. more or less parallel with the cylindrical rods 110, 120 of the hydraulic drive system 100. In other words, the horizontal stopper is acting along a (more or less) horizontal direction. By means of the adjustable mechanical stop 200, the stroke of the driving parts for making the dies move is now controlled, or in other words, the die spacing or distance between the dies can be manipulated in a controlled way. The adjustable mechanical stop 200 comprises of a supporting system, in this instance a plate or disk 210, onto which mounting elements are mounted, in this instance nut-shaped elements 220, 230, 240, 250, out of which protrusions, in this example bolts are protruding. According to this design, four nut-shaped mounting elements are pairwise provided onto a circular supporting system, in a circular symmetric manner, whereas other designs may also occur in accordance with the invention, wherein more or less nut-shaped mounting elements with bolts (protrusions) accordingly are present. For two of the nut-shaped mounting elements 220, 230 the corresponding protruding bolts 221, 231 are visible in FIG. 2, whereas the bolts of the other two nut-shaped mounting elements 240, 250 are hidden behind the upper arm 160 of the transmission member 150.

Figure 4:
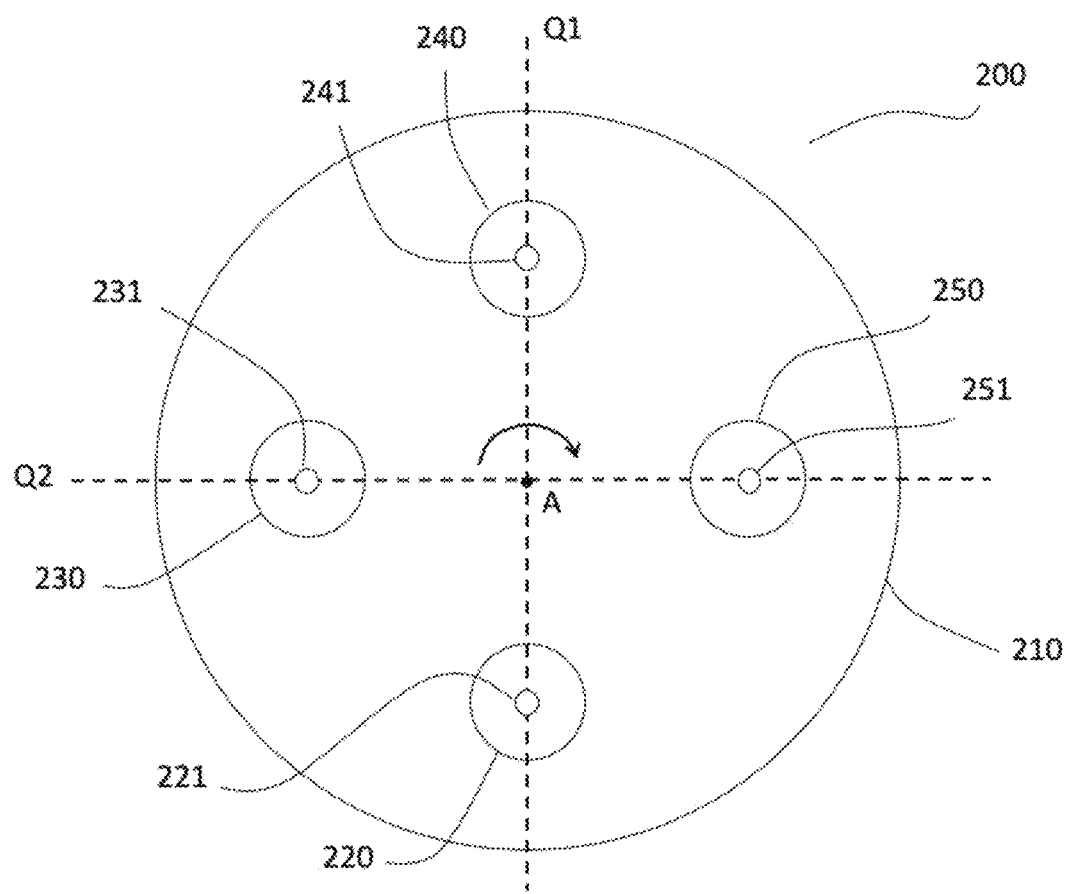
FIG. 4 illustrates schematically enlarged version of an embodiment of an adjustable mechanical stop for a food baking apparatus in accordance with the invention, as of FIG. 2.

Referring now to FIG. 4, the adjustable mechanical stop 200 of the embodiment of FIG. 2 is represented more schematically in front view and in an enlarged format. As shown, all protruding bolts 221, 231, 241, 251 of respective nut-shaped mounting elements 220, 230, 240, 250 are displayed now. The amount of protrusion can differ amongst nut-shaped mounting elements 220, 230, 240, 250 and is in fact installable or adjustable by means of more or less screwing the bolts 221, 231, 241, 251 in the nut-shaped mounting elements 220, 230, 240, 250. This screwing can be done either manually, or else for example an electromotor is coupled for driving the bolts 221, 231, 241, 251 more in or out of the nut-shaped elements 220, 230, 240, 250. The supporting plate or disk 210 is circularly shaped having a central axis A being perpendicular to the plane of the drawing of FIG. 4. The bolts 221, 231, 241, 251 are rod-shaped and have their longitudinal axis also perpendicular to FIG. 4, hence being parallel with the axis A. The nut-shaped mounting elements 220, 230, 240, 250 are positioned onto the disk shaped supporting system 210 in a circular symmetric manner. More in particular, the four nut-shaped mounting elements 220, 230, 240, 250 are each of them lying on one of the axes Q1, Q2 forming quadrants. In fact, the nut-shaped mounting elements 220, 230, 240, 250 are lying per pair onto one of the axes Q1, Q2, i.e. onto the axis Q1 nut-shaped mounting elements 220, 240 are positioned, whereas onto the axis Q2 nut-shaped mounting elements 230, 250 can be seen. The respective protruding bolts 221, 241 of nut-shapes 220, 240 pair and corresponding bolts 231, 251 of nut-shapes 230, 250 pair are also lying onto corresponding axes Q1, Q2 respectively. The nut-shaped mounting elements 220, 230, 240, 250 are thus together with their respective bolts 221, 231, 241, 251 lying per pair onto a common disk diameter. In other words, a first pair of nut-shapes and bolts is formed by nut-shaped mounting elements 220, 240, and their corresponding bolts 221, 241, while a second pair is formed by nut-shaped mounting elements 230, 250, and their corresponding bolts 231, 251. According to an embodiment, when a pair of nut-shaped mounting elements and respective bolts is positioned horizontally along the axis Q2, it will act as mechanical stop for the food baking apparatus, more in particular it will enable stopping the hydraulic drive of the apparatus. Even more in particular, the protruding bolts 231, 251 will determine the end stroke of the drive system 100, when touching the upper arm 160 of the transmission member 150 whenever pushed towards near vertical alignment of the arms. According to a further embodiment, the amount of protrusion of the bolts is the same per pair, meaning that here e.g. the bolts 221, 241 from the first pair are protruding with the same amount, whereas the bolts 231, 251 from the second pair are also protruding with the same amount, although the amount of protrusion may differ from pair to pair. The supporting plate or disk 210 can be rotated around its central axis A, either manually, or else motor driven. This way, the nut-shaped mounting elements 220, 230, 240, 250 and their corresponding bolts 221, 231, 241, 251 can change in radial position. This way another pair may be selected into horizontal position for acting as stop for the hydraulic drive system 100. As depicted in FIG. 4, the second pair of nut-shaped mounting elements 230, 250 and respective bolts 231, 251 are in horizontal position along the axis Q2, and hence acting here as selected stop mechanism. When turning the supporting plate or disk 210 for 90° to the right, or in clockwise direction, around its central axis A, the first pair of nut-shaped mounting elements 220, 240 and corresponding bolts 221, 241 will come into horizontal position along the axis Q2. The first pair is then selected as stop mechanism for the drive system.

In accordance with an embodiment, the number of nut shaped mounting elements, herein also referred to as nut-shapes, and corresponding bolts is not fixed to four, but can also be larger or smaller. The number of nut-shapes and corresponding bolts is even, in accordance with further embodiment, more in particular the nut-shapes and respective bolts come in pairs lying in line, or on the same diameter in case of a circularly shaped supporting plate or disk 210. As an example, the supporting plate or disk 210 is e.g. provided with eight nut-shapes and corresponding bolts, or either four pairs of nut-shapes with respective bolts. Suppose two pairs are added to the configuration of FIG. 2 and FIG. 4, just in between the existing first pair and second pair in a radial symmetric manner, such that the nut-shapes with bolts form a regular octagon. The selection for horizontal position of a pair, i.e. selecting the mechanical stop mechanism or protrusion wanted, can now occur every 45° turning the plate 210 around its axis A.

Figure 3:
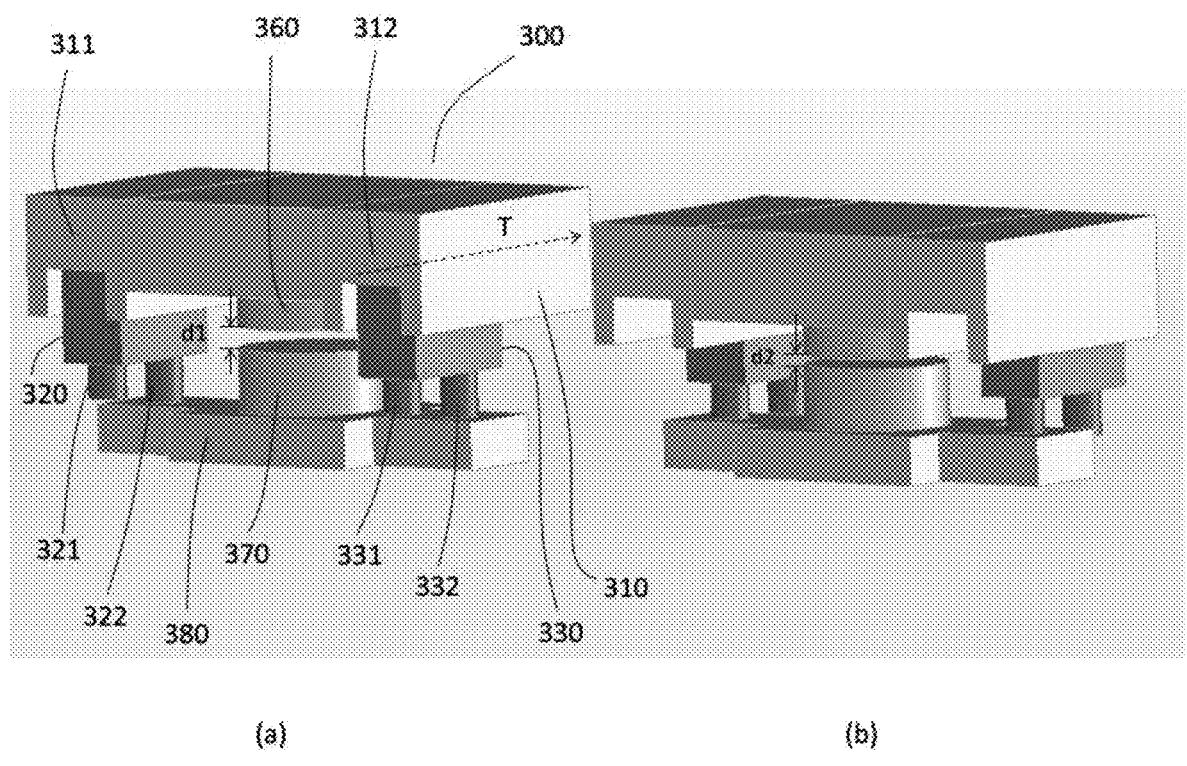
FIG. 3 illustrates an embodiment of an adjustable mechanical stop for another food baking apparatus in accordance with the invention.

With FIG. 3 another embodiment in accordance with the invention is illustrated. Here an adjustable mechanical stop 300 is shown for use at another position of a food baking apparatus, comprising compressible, i.e. movable dies, indicating a possible movement of the dies e.g. bringing them closer towards each other or further away from each other, during which compression takes place. The stop 300 is now occurring in the neighbourhood of the upper and lower die 360, 370 for regulating or adjusting the position therein between, and herein after also referred to as drive stopper, more in particular here referred to as vertical drive stopper. With the design and positioning of mechanical adjustable stop 300, the drive system or punch is stopped along vertical direction, i.e. along the adjustable spacing direction of the movable dies. In other words, the vertical stopper is acting along a (more or less) vertical direction. The same adjustable mechanical stop 300 is depicted in FIG. 3(*a*) and FIG. 3(*b*) although the position of one of the components, the mounting elements 320, 330 in particular, has changed. As indicated in FIG. 3(*a*) the adjustable mechanical stop 300 comprises a supporting system, in this instance a plate 310, onto which two mounting elements 320, 330 are movably mounted, and each of said mounting elements comprises rod-shaped 321, 322, 331, 332 protrusions. The mounting elements 320, 330 comprise two rod-shaped protrusions each, and the rod-shaped protrusion may differ in length, i.e. in amount of protrusion. A first mounting element 320 on one end of the supporting plate 310 comprises the rod-shaped protrusions 321, 322 wherein rod-shaped protrusion 321 is shorter or is less protruding than rod-shaped protrusion 322. A second mounting element 330 is mounted on the other end of the supporting plate 310, whereas this second mounting element 330 is identical in shape and size, including rod-shaped protrusions 331, 332, to the first mounting element 320 with rod-shaped protrusions 321, 322. Referring further to FIG. 3(*a*), both first and second mounting element 320, 330 are positioned such that the rod-shaped protrusions 322, 332 with longest protrusion are so-called selected, meaning that they are touching the lower surface 380 onto which the lower die 370 is mounted. In this position of mounting elements 320, 330 and hence selected rod-shaped protrusions 322, 332, a distance d1 between upper and lower die 370, 380 is present. The punching lower surface 380 is for instance raised by means of a hydraulic drive system there beneath. Both mounting elements 320, 330 can be shifted or translated within the supporting plate 310 to another position along the axis T, being perpendicular to the direction of the rod-shaped protrusions. For this mounting piece shifting of translating corresponding recesses 311, 312 are provided at each end of the supporting plate 310. Whenever shifting or translating the mounting elements 320, 330 in the direction of the arrow of axis T, another position can be achieved, as shown in FIG. 3(*b*). In this latter, both first and second mounting element 320, 330 are now positioned such that the rod-shaped protrusions 321, 331 with shortest protrusion are touching the lower surface 380 onto which the lower die 370 is mounted. In this position of mounting elements 320, 330 and thus selected rod-shaped protrusions 321, 331, a shorter distance d2 between upper and lower die 370, 380 is accomplished.

This mechanical horizontal drive stopper can be combined in a food baking apparatus with the mechanical vertical drive stopper as herein described. Thus in a further aspect of the invention a food baking apparatus is provided, comprising a horizontal drive stopper and a vertical drive stopper according to the invention.

According to an embodiment of the invention, a mechanical adjustable drive stopper (for a food baking apparatus) is provided acting along a first direction, and another mechanical adjustable drive stopper (for a food baking apparatus) is provided acting along a second direction. According to a further embodiment, further (or multiple) mechanical adjustable drive stoppers (for a food baking apparatus) can be provided acting along a further direction. Having a plurality of mechanical adjustable drive stoppers within one food baking apparatus, acting along multiple different directions, may enable fine-tuning and highly accurate adjustability of the driving system, or herewith controlled compression mechanism, in particular referring to e.g. multiple or double compression or partial press mechanism.

The invention claimed is:

1. A food baking apparatus comprising:
a transmission member;
a drive system configured to push the transmission member;
a first die and a second die, the first die and the second die being movable toward or away from each other by the transmission member when the transmission member is pushed by the drive system; and
an adjustable mechanical stop that controls a die spacing defined between the first die and the second die for providing a food product to be baked by the food baking apparatus, the mechanical stop comprising:
a supporting system; and
at least one mounting element mounted onto the supporting system;
wherein:
the supporting system with the at least one mounting element mounted thereon is rotatable about a central axis of the supporting system;
the at least one mounting element comprises one or more protrusions that stop movement of the transmission member, thereby stopping further compression of the first die and the second die at the die spacing, the one or more protrusions being selectable by the rotation of the supporting system, such that a selected protrusion has an amount of protrusion that controls the die spacing, and
the one or more protrusions of the at least one mounting element comprise at least one of (a) or (b):
(a) at least one adjustable protrusion that is adjustable in amount of protrusion; and
(b) at least two protrusions differing in amounts of protrusion amongst each other.

2. The food baking apparatus according to claim 1, wherein the one or more protrusions of the at least one mounting element have a direction of protrusion along a longitudinal axis of the protrusion parallel to the central axis of the supporting system.

3. The food baking apparatus according to claim 2, wherein the at least one mounting element comprises at least one adjustable protrusion that is adjustable in amount of protrusion, the food baking apparatus further comprising a motorized system that adjusts the amount of protrusion of the at least one adjustable protrusion.

4. The food baking apparatus according to claim 2, comprising at least a first pair of mounting elements and a second pair of mounting elements, each pair of mounting elements being mounted onto the supporting system in a circular symmetric manner about the central axis, wherein:
the first pair of mounting elements comprises a first mounting element and a second mounting element, the second mounting element being mounted onto the supporting system diametrically opposite the first mounting element, the first mounting element comprising a first protrusion, the second mounting element comprising a second protrusion;
the second pair of mounting elements comprises a third mounting element and a fourth mounting element, the third mounting element being mounted onto the supporting system diametrically opposite the fourth mounting element, the third mounting element comprising a third protrusion, the fourth mounting element comprising a fourth protrusion;
the first protrusion and the second protrusion have a same first amount of protrusion;
the third protrusion and the fourth protrusion have a same second amount of protrusion; and
the first amount of protrusion and the second amount of protrusion are the same or different.

5. The food baking apparatus according to claim 4, wherein:
the first pair of mounting elements are aligned along a first axis of the supporting system perpendicular to the central axis;
the second pair of mounting elements are aligned along a second axis of the supporting system perpendicular to the central axis; and
the first axis is perpendicular to the second axis.

6. The food baking apparatus according to claim 1, wherein the adjustable mechanical stop comprises at least one pair of mounting elements mounted onto the supporting system in a circular symmetric manner about the central axis, the at least one pair of mounting elements comprising a first mounting element and a second mounting element, the second mounting element being mounted onto the supporting system diametrically opposite the first mounting element.

7. The food baking apparatus according to claim 6, wherein:
the first mounting element comprises a first protrusion;
the second mounting element comprises a second protrusion; and
the first protrusion and the second protrusion have different amounts of protrusion.

8. The food baking apparatus according to claim 1, wherein the supporting system is disk shaped.

9. The food baking apparatus according to claim 1, wherein the one or more protrusions of the at least one mounting element are bolt shaped.

* * * * *